(No Model.)
H. R. STEPHENS.
AUTOMATIC REGULATOR FOR WINDMILLS.
No. 356,295. Patented Jan. 18, 1887.
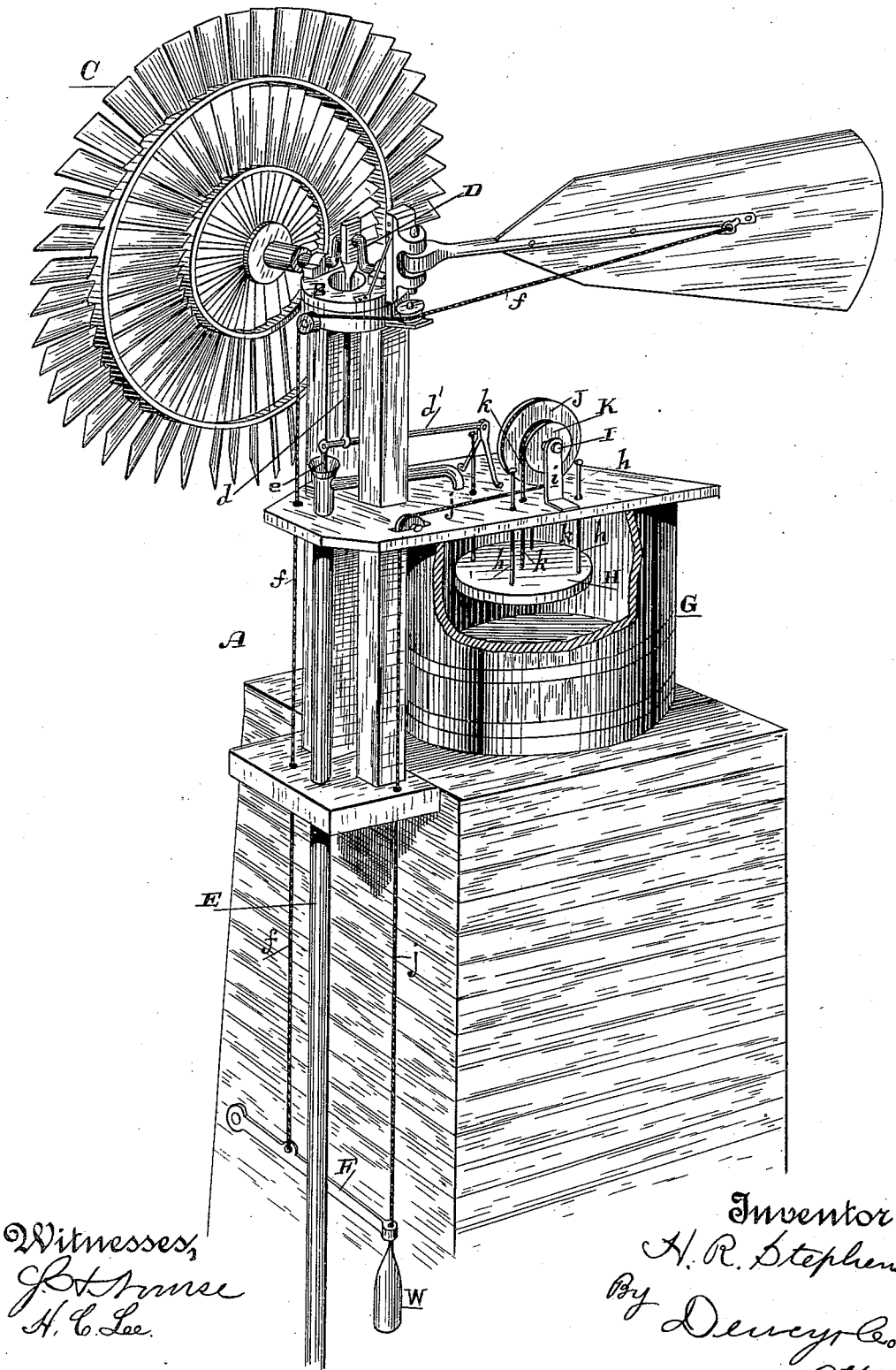

UNITED STATES PATENT OFFICE.

HERMAN R. STEPHENS, OF SOLEDAD, CALIFORNIA.

AUTOMATIC REGULATOR FOR WINDMILLS.

SPECIFICATION forming part of Letters Patent No. 356,295, dated January 18, 1887.

Application filed September 24, 1886. Serial No. 214,463. (No model.)

*To all whom it may concern:*

Be it known that I, HERMAN R. STEPHENS, of Soledad, Monterey county, State of California, have invented an Improvement in Automatic Regulators for Windmills; and I hereby declare the following to be a full, clear, and exact description of the same.

My invention relates to that class of regulators or governors for windmills in which the wind-wheel is thrown into or out of the wind by means of mechanism operated automatically by the rise and fall of the water in the tank.

My invention consists in the construction and combination of devices, all of which I shall hereinafter fully describe.

The object of my invention is to provide simple and effective means for automatically throwing the mill into and out of action, according as the water in the tank is low or high.

Referring to the accompanying drawing for a more complete explanation of my invention, the figure is a perspective view of my regulator, showing its application to the mill.

A is the tower of the mill. B is the turn-table. C is the wind-wheel, D the crank-shaft, d the connecting-rod, d' the lever, E the pump, and e the pump-pitman, all arranged and connected in the usual manner.

The wind-wheel is thrown into or out of the wind by means of the cord or wire f, which is operated by a pivoted lever, F, one end of which has the weight W.

G is the water-tank, into which the pump discharges. Within the tank is a float, H, which may be suspended and guided in its movement by any suitable means, though I have here shown four loosely-seated rods or bolts, h. Mounted in a suitable bracket, i, upon the top of the tank, is a short shaft, I, upon which are rigidly secured two pulleys—a large one, J, and a small one, K. These may be separate, or they may be formed integral; but in either case they move with shaft I. A cord or wire, j, is secured to and adapted to wind upon the large pulley J, while a cord or wire, k, is secured to and adapted to wind upon the smaller pulley, K, the direction of the winding of the two cords or wires being the reverse of each other, as shown. The cord or wire j is carried down over suitable guide-sheaves, and is connected at its lower end with the pivoted weighted lever F. The cord or wire k is carried down into the tank, and is connected with the float H.

The operation of my regulator is as follows: As the water in the tank is used and its level lowers, the float H descends. By this movement, through the cord or wire k, pulley K, and shaft I, the pulley J is rotated, so that it winds up the cord or wire j, and thereby raises the lever F, the movement of which through the cord or wire f allows the mill to turn into the wind, and thus effects its operation. As the water rises in the tank the float rises also, thus slacking up the cords or wires, so that the weighted lever F moves down again, and, pulling on the cord or wire f, throws the mill out of the wind and stops it. The object in making the pulley K smaller in diameter than the pulley J is to cause a short movement of the float, to effect a longer movement of lever F.

Having thus described my invention, what I claim as new, and desire to secure by Letters Patent, is—

An automatic regulator or governor for windmills, consisting of the pivoted weighted lever F, the cord or wire f, connecting it with the mill, whereby its movement throws the mill into or out of the wind, the vertically-moving float H in the water-tank of the mill, the shaft I, the pulley J on said shaft, the pulley K, also on said shaft and having a diameter smaller than pulley J, the rod or wire k, connecting the float with pulley K, and the cord or wire j, connecting lever F with pulley J, all arranged and adapted to operate substantially as herein described.

In witness whereof I have hereunto set my hand.

HERMAN R. STEPHENS.

Witnesses:
S. H. NOURSE,
H. C. LEE.